(12) United States Patent
Lautenschlager et al.

(10) Patent No.: US 7,676,025 B2
(45) Date of Patent: Mar. 9, 2010

(54) METHOD OF LISTENING IN TO CALLS

(75) Inventors: Wolfgang Lautenschlager, Weissach-Flacht (DE); Uwe Stahl, Leonberg (DE)

(73) Assignee: ALCATEL, Paris (FR)

( * ) Notice: Subject to any disclaimer, the term of this patent is extended or adjusted under 35 U.S.C. 154(b) by 1772 days.

(21) Appl. No.: 10/373,222

(22) Filed: Feb. 26, 2003

(65) Prior Publication Data

US 2003/0174695 A1 Sep. 18, 2003

(30) Foreign Application Priority Data

Mar. 15, 2002 (EP) ................... 02360089

(51) Int. Cl.
*H04M 1/24* (2006.01)

(52) U.S. Cl. ................ 379/35; 379/70; 379/112.01; 379/126; 379/133; 379/201.05; 455/67.12; 370/352; 370/395.52

(58) Field of Classification Search .............. 379/35, 379/32.05, 67.1, 32, 33, 70, 112.01, 219, 379/126, 133, 201.05; 370/356, 390, 235, 370/381, 389, 410, 352, 395.52; 713/201; 726/11, 22; 380/286; 455/67.1, 410, 67.12
See application file for complete search history.

(56) References Cited

U.S. PATENT DOCUMENTS

| | | | | |
|---|---|---|---|---|
| 4,056,684 | A * | 11/1977 | Lindstrom | 370/381 |
| 5,428,667 | A * | 6/1995 | Easterling et al. | 455/410 |
| 5,590,171 | A * | 12/1996 | Howe et al. | 379/33 |
| 5,745,573 | A * | 4/1998 | Lipner et al. | 380/286 |
| 5,943,393 | A * | 8/1999 | Howell | 379/35 |
| 6,097,798 | A * | 8/2000 | Albers et al. | 379/114.28 |
| 6,229,887 | B1 * | 5/2001 | Albers et al. | 379/219 |
| 6,233,313 | B1 * | 5/2001 | Farris et al. | 379/112.01 |

(Continued)

FOREIGN PATENT DOCUMENTS

EP 1 111 892 A2 6/2001

(Continued)

OTHER PUBLICATIONS

ETSI: Telecommunications Security; Lawful Interception (LI); Issues on IP Interception ETSI TR 101 944 V1.1.1, Jun. 14, 2001, pp. 1-19, XP002212721.

(Continued)

*Primary Examiner*—Gerald Gauthier
(74) *Attorney, Agent, or Firm*—Sughrue Mion, PLLC

(57) ABSTRACT

The invention relates to a method of listening in to calls between two or more subscribers of a communications network comprising one or more IP networks as well as to a listening server, a call control server, and an IP router for carrying out the method. When the listening server detects a request to monitor one of the subscribers, it determines at least one call control server assigned to the subscriber. Further, at least one IP router is determined which is responsible for a network access point of the subscriber to the IP network or IP networks. The listening server causes the at least one determined call control server to acquire call data associated with calls in which the subscriber is involved. Further, the at least one determined IP router is caused to acquire contents data associated with calls in which the subscriber is involved.

19 Claims, 3 Drawing Sheets

U.S. PATENT DOCUMENTS

| | | | | |
|---|---|---|---|---|
| 6,438,695 | B1 * | 8/2002 | Maufer | 726/11 |
| 6,498,843 | B1 * | 12/2002 | Cox | 379/207.02 |
| 6,549,613 | B1 * | 4/2003 | Dikmen | 379/70 |
| 6,553,025 | B1 * | 4/2003 | Kung et al. | 370/352 |
| 6,560,224 | B1 * | 5/2003 | Kung et al. | 370/356 |
| 6,654,589 | B1 * | 11/2003 | Haumont | 455/67.11 |
| 6,728,338 | B1 * | 4/2004 | Kampmeier et al. | 379/35 |
| 6,785,515 | B1 * | 8/2004 | Sommer et al. | 455/67.12 |
| 6,807,265 | B2 * | 10/2004 | Boehmke | 379/201.05 |
| 6,839,323 | B1 * | 1/2005 | Foti | 370/235 |
| 7,006,508 | B2 * | 2/2006 | Bondy et al. | 370/410 |
| 7,027,398 | B2 * | 4/2006 | Fang | 370/235 |
| 7,054,431 | B2 * | 5/2006 | Fleischer et al. | 379/221.08 |
| 7,055,174 | B1 * | 5/2006 | Cope et al. | 726/22 |
| 7,151,772 | B1 * | 12/2006 | Kalmanek et al. | 370/390 |
| 7,283,521 | B1 * | 10/2007 | Ryan | 370/389 |
| 2001/0052081 | A1 * | 12/2001 | McKibben et al. | 713/201 |
| 2003/0219103 | A1 * | 11/2003 | Rao et al. | 379/32.05 |

FOREIGN PATENT DOCUMENTS

| | | |
|---|---|---|
| WO | WO 99/55062 A1 | 10/1999 |
| WO | WO 01 89145 A2 | 11/2001 |
| WO | WO 02/17036 A2 | 2/2002 |

OTHER PUBLICATIONS

ITU-T H.323, International Telecommunication Union, Series H: Audiovisual and Multimedia Systems, "Packet-based multimedia communications system", p. 1-2, Sep. 1999.

* cited by examiner

METHOD OF LISTENING IN TO CALLS

TECHNICAL FIELD

This invention relates to a method of listening in to calls between two or more subscribers of a communications network which comprises one or more IP networks. The invention further relates to a listening server for supporting the listening in to calls between two or more subscribers of a communications network as well as to a call control server and an IP router for carrying out the method.

The invention is based on a priority application EP 02360089.3, which is hereby incorporated by reference.

BACKGROUND OF THE INVENTION

National and international laws require communications network operators to provide mechanisms within the network which enable authorities who have a need to know (police, secret services, . . . ) to monitor telephone conversations of suspicious persons.

The invention is based on the way the problem is solved in a classic telephone network:

At the local switching center of the subscriber to be monitored, the data record of the subscriber is marked and a sort of conference connection is established to the authority. The basic data to be determined for the respective listening process is determined by the switching center by accessing an authority database which is part of the switching center. The whole monitoring mechanism thus forms part of the switching center.

A problem consists in the fact that there are increasing technical possibilities of routing telephone calls through communications networks in whole or in part as VOIP calls (VOIP=Voice over IP; IP=Internet Protocol). Conventional methods are not suited for monitoring this kind of communications traffic.

SUMMARY OF THE INVENTION

The object of the invention is to ensure the listening in to calls even if the communications network through which the calls are routed comprises one or more IP networks.

This object is attained by a method of listening in to calls between two or more subscribers of a communications network comprising one or more IP networks, wherein a listening server, when detecting a request to monitor one of the subscribers, determines at least one call control server associated with the subscriber, that at least one IP router is determined which is responsible for a network access point of the subscriber to the IP network or IP networks, that the listening server causes the at least one determined call control server to acquire call data associated with calls in which the subscriber is involved, and that the at least one determined IP router is caused to acquire contents data associated with calls in which the subscriber is involved.

The object is further attained by a listening server for supporting the listening in to calls between two or more subscribers of a communications network wherein the listening server comprises a control unit which is so designed that when detecting a request to monitor one of the subscribers, it determines at least one call control server associated with the subscriber, and that the control unit is further designed to cause the at least one determined call control server to acquire call data associated with calls in which the subscriber is involved.

The object is further attained by a call control server comprising a control unit for controlling calls in an IP network, wherein the call control server further comprises a listening logic which is so designed that when caused to do so by a listening server which, in response to a request to monitor a subscriber, has determined the call control server as a call control server associated with the subscriber, acquires contents data associated with calls in which one or more subscribers determined by the listening server are involved.

The object is further attained by an IP router comprising a control unit for controlling the switching of IP packets in an IP network, wherein IP router comprises a listening logic which is so designed that, when caused to do so by a listening server which, in response to a request to monitor a subscriber, has determined the IP router as an IP router responsible for a network access point of the subscriber to the IP network, acquires contents data associated with calls in which one or more subscribers determined by the listening server are involved.

The idea underlying the invention is to acquire call data about calls to be monitored by means of one ore more call control servers and to acquire contents data about such calls by means of one or more IP routers, each of which is responsible for one network access point of the subscriber to the IP network or to one of the IP networks.

The advantage of the invention lies in the fact that it permits complete monitoring of telephone calls which are routed in whole or in part through one or more IP networks. The method of data acquisition is particularly effective and requires only a small of amount of resources. Furthermore, the invention can be integrated into existing network structures in a simple manner.

Another advantage is that the monitoring by the method according to the invention is completely silent, i.e., that it is impossible for the subscriber being monitored to find out about the monitoring.

Advantageous developments of the invention are apparent from the subclaims.

BRIEF DESCRIPTION OF THE DRAWINGS

The invention will become more apparent by reference to the following description of several embodiments taken in conjunction with the accompanying drawings, in which.

DETAILED DESCRIPTION OF THE DRAWINGS

Figure 1:
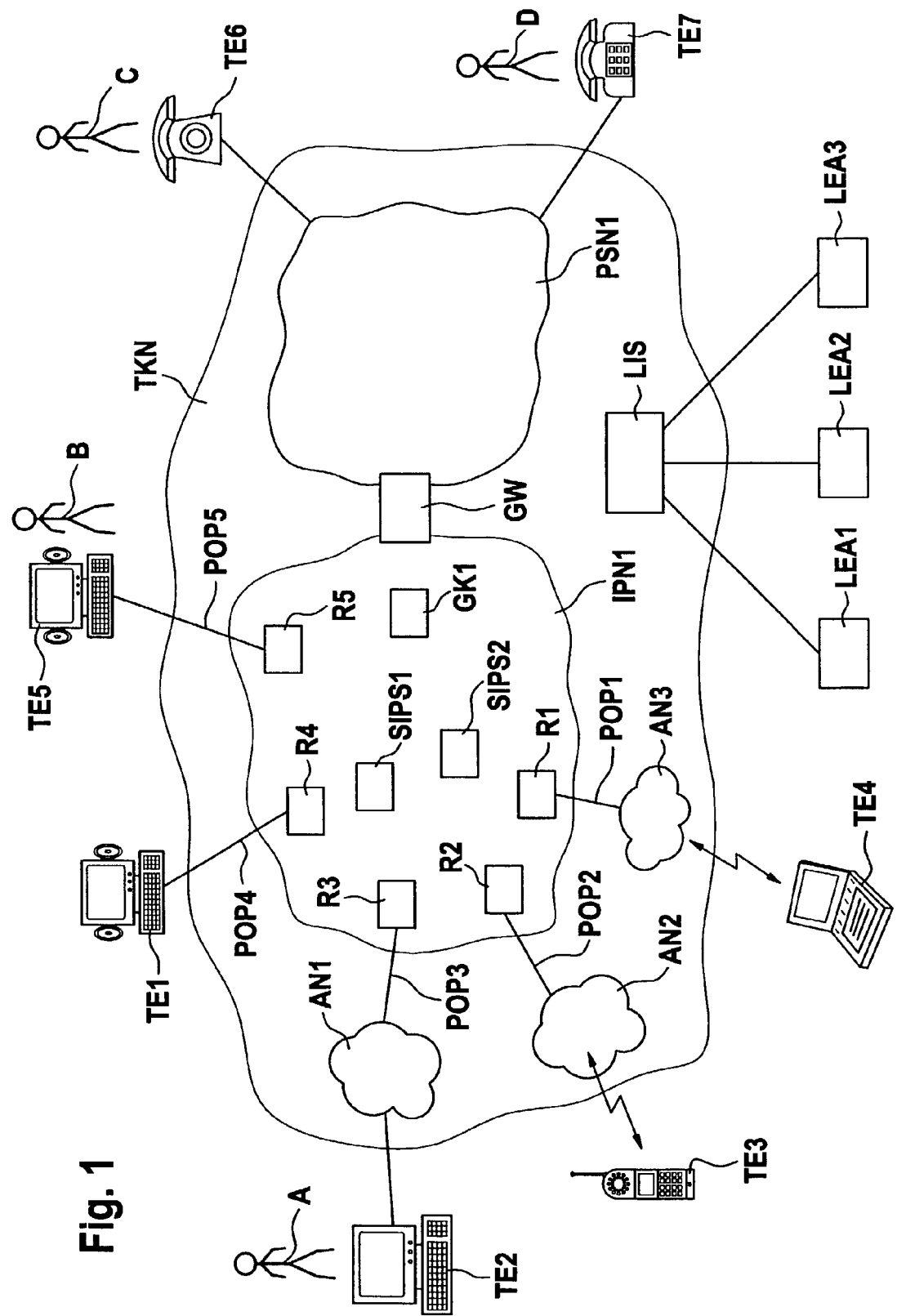
FIG. 1 shows a block diagram of a communications network with a listening server according to the invention, several call control servers according to the invention, and several IP routers according to the invention for a first embodiment.

FIG. 1 shows a communications network TKN, several terminals TE1 to TE7, and three servers LEA1 to LEA3.

Communications network TKN is a network through which voice calls can be routed. It is also possible, however, that in addition or alternatively, data and video calls can be routed, or data can be transmitted in connectionless mode, through communications network TKN. Communications network TKN preferably comprises one or more telephone networks which may also be assigned to different network operators. Furthermore, communications network TKN comprises one or more IP networks (IP=Internet Protocol). In addition, communications network TKN may comprises one or more access networks, through which subscriber terminals can access one of the above-mentioned networks of communications network TKN.

Of the subnetworks of communications network TKN, FIG. 1 shows, by way of example, a telephone network PSN1, an IP network IPN1, and three access networks AN1 to AN3, through which access can be gained to IP network IPN1. Telephone network PSN1 is a PSTN or ISDN network (PSTN=Public Switched Telephone Network, ISDN=Integrated Services Digital Network). It has one or more switching centers which establish telephone connections between terminals of telephone network PSN1 and provide network interworking functions for interfacing with other subnetworks of communications network TKN.

IP network IPN1 is a data network which uses for the Layer 3 protocol an IP protocol, preferably the TCP/IP protocol stack (TCP=Transmission Control Protocol). For the Layer 2 protocols or MAC protocols (MAC=Medium Access Control), a great number of different protocols, such as Ethernet, DQDB, and/or ATM protocols (DQDB=Distributed Queue Dual Bus, ATM=Asynchronous Transfer Mode), can be used in IP network IPN1. IP network IPN1 comprises a plurality of IP routers which switch data packets at the IP level. IP network IPN1 may be the Internet, but it may also be the network of a particular network operator.

Access networks AN1 to AN3 enable terminals TE2 to TE4 to gain access to IP network IPN1. Access network AN1 is a telephone network. Through this telephone network, a telephone connection over which data is transferred by means of a modem, for example, is set up between terminal TE2 and an access point to IP network IPN1. Access network AN2 is a mobile radio network, for instance a network based on the GSM or UMTS Standard (GSM=Global System for Mobile Communications, UMTS=Universal Mobile Telecommunications System). Access network AN3 is a wireless LAN (LAN Local Area Network).

Terminals TE1 to TE7 are terminals with which voice communication is possible via communications network TKN. Terminal TE1 is a VOIP telephone. It is connected to IP network IPN1 via a network access point POP4. Terminal TE2 is a computer with VOIP software and peripheral components which enable it, on the one hand, to communicate with IP network IPN1 via access network AN1 and, on the other hand, to receive voice signals from and send voice signals to a subscriber. The hardware of terminal TE2 thus includes a loudspeaker, a microphone, and an ISDN card or an analog modem.

Terminal TE3 is a UMTS or GSM terminal.

Terminal TE4 is a computer which is provided with an interface card for processing the wireless-LAN protocol of access network AN3. Terminal TE4, like terminal TE2, has peripheral units which permit voice communication with a subscriber.

Terminal TE5 is identical in design to terminal TE1. Terminals TE6 and TE7 are telephone terminals that can be connected to a PSTN or ISDN network.

Terminals TE1 to TE4 are assigned to a subscriber A. "Assigned" as used here means that these terminals can be used by subscriber A for communication. The assignment is made via the physical address of the network access in the case of terminals TE1 and TE2 and via a user identification in the case of terminals TE3 and TE4.

Terminal TE5 is assigned to a subscriber B. Terminals TE6 and TE7 are assigned to a subscriber C and a subscriber D, respectively.

Of the network elements of IP network IPN1, FIG. 1 shows, by way of example, five IP routers R1 to R5 and three call control servers SIPS1, SIPS2, and GK1. Also shown in FIG. 1 is a gateway GW between IP network IPN1 and telephone network PSN1.

Via IP routers R1 to R5, access is possible to IP network IPN1. IP routers R1, R2, and R3 are connected via network access points POP1, POP2, and POP3 to access networks AN3, AN2, and AN1, respectively. In addition to performing the function of switching IP packets that are to be transferred to the respective access networks or come from respective access networks, IP routers R1 to R3 may provide a network access function. This network access function may also be provided by a network access server connected to the IP router proper. Then, in the sense of the invention, each of IP routers R1 to R3 is formed by the respective IP router proper and this network access server.

IP routers R4 and R5 are of the same design as IP routers R1 to R3 and are connected via network access points POP4 and POP5 to terminals TE1 and TE5, respectively.

Call control servers SIPS1, SIPS2, and GK1 offer a service to control or support the setting up of VOIP calls through IP network IPN1. They may also support the addressing of such calls.

It is also possible that call control servers SIPS1, SIPS2, and GK1 offer a service which controls or supports the establishment of video or data calls through IP network IPN1.

Call control servers SIPS1 and SIPS2 are SIP servers or SIP proxy servers (SIP=Session Initiation Protocol). These SIP servers support and control the establishment of calls through IP network IPN1 using the SIP protocol.

Call control server GK1 is a gatekeeper according to ITU-T Recommendation H.323. The design and operation of call control server GK1 are described, for example, in ITU-T H.323, 11/96.

It is also possible that further, different call control servers are available in IP network IPN1. Such call control servers may provide any kind of call control or call support functions within IP network IPN1 or for cross-network traffic to support the creation of or bandwidth allocation to virtual connections through IP network IPN1.

IP network IPN1 may also have a different number of call control servers, of course. In general, IP network IPN1 will have a plurality of such call control servers which offer different kinds of call control services within IP network IPN1. Gateway GW between telephone network PSN1 and IP network IPN1 converts a telephone connection through telephone network PSN1 to a VOIP connection through IP network IPN1. It thus comprises functions which encode/decode and compress/decompress voice signals and packetize/depacketize a data stream. Gateway GW may be constructed according to ITU-T Recommendation H.323, for example. Advantageously, the functions of gateway GW are controlled by one or all of call control servers SIPS1, SIPS2, and GK1.

Communications network TKN further comprises a listening server LIS, which is connected to servers LEA1, LEA2, and LEA3. Each of servers LEA1 to LEA3 is assigned to a specific authority. Servers LEA1 to LEA3 initiate for the respective authority the monitoring of calls which are routed through communications network TK1. Furthermore, servers LEA1 to LEA3 receive from communications network TKN data which were obtained in communications network TK1 through the initiated monitoring.

For example, the authority that is assigned the server LEA1 intends to monitor all calls in which subscriber A is involved. These calls may be voice, data, and/or video calls. Server LEA1 sends a request to listening server LIS to monitor subscriber A.

On detecting this request, listening server LIS determines at least one call control server associated with subscriber A. This call control server may have different IP networks assigned to it. Advantageously, the listening server determines those call control servers which can support the establishment of calls of the type to be monitored to or from subscriber A through an IP network. It is also possible, however, that listening server LIS determines all call control servers of an IP network of communications network TKN.

In this embodiment, listening server LIS, in response to the request from server LEA1, determines call control servers SIPS1, SIPS2, and GK1, which support the establishment of VOIP calls.

Furthermore, listening server LIS, on detecting the request from server LEA1, determines at least one IP router which is responsible for a network access point of subscriber A to the IP network or to one of the IP networks of communications network TKN. "Responsible" as used herein means that traffic from or to the subscriber which is routed through this network access point is switched by the IP router. Advantageously, listening server LIS determines for each of the IP networks of communications network TKN those IP routers which are responsible for possible network access points of subscriber A to the respective IP network. As a rule, however, it will suffice to determine one network access point, and thus one IP router, for a subscriber.

In this embodiment, listening server LIS, in response to the request from server LEA1, determines IP routers R1 to R4, which are responsible for network access points POP1 to POP4 of subscriber A.

Listening server LIS now causes at least one of the determined call control servers to acquire data associated with calls in which subscriber A is involved.

Thus, in this embodiment, listening server LIS causes call control servers SIPS1, SIPS2, and GK1 to acquire data associated with calls in which subscriber A is involved.

Listening server LIS further causes the at least one determined IP router to acquire contents data associated with calls in which subscriber A is involved.

Thus, in this embodiment, listening server LIS causes IP routers R1 to R4 to acquire contents data associated with calls in which subscriber A is involved.

It is also possible that listening server LIS does not cause IP routers R1 to R4 to acquire contents data. The request from server LEA1 to monitor subscriber A may specify, for example, that only call data is to be obtained.

The call and contents data thus acquired by call control servers and IP routers can be either stored in the respective call control servers or IP routers or transferred from the latter to listening server LIS, to other elements of communications network TKN, to server LEA1, or to a server designated by server LEA1.

Figure 2:
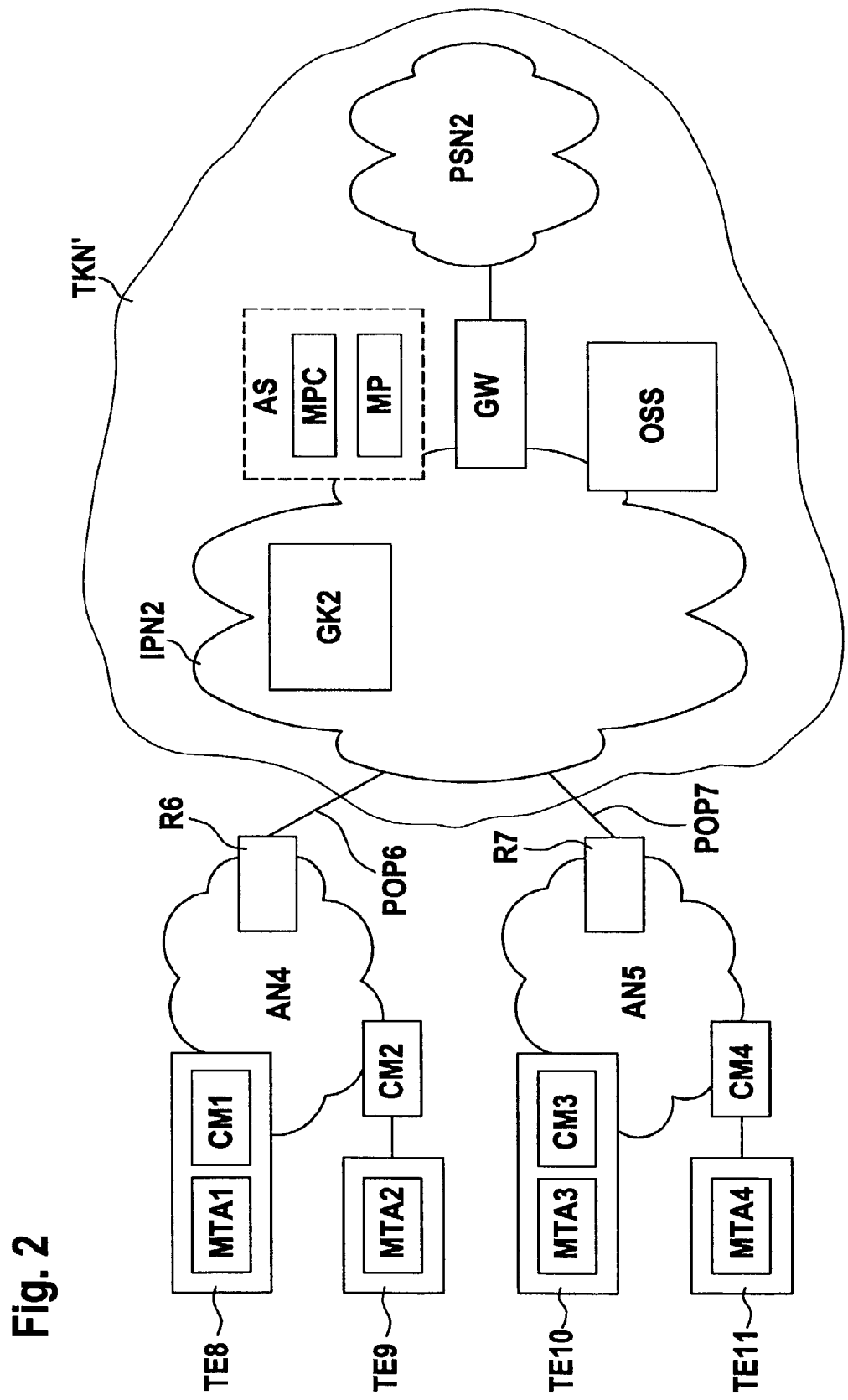
FIG. 2 shows a block diagram of a portion of a communications network with a call control server according to the invention and several IP routers according to the invention for a second embodiment.

Referring now to FIG. 2, there is illustrated a further embodiment of the structure of a communications network in which the above-described method of listening in to calls can be used.

FIG. 2 shows a communications network TKN', two access networks AN4 and AN5, two IP routers R6 and R7, four terminals TE8 to TE11, and two modems CM2 and CM4.

Terminals TE8 and TE10 incorporate transmission units MTA1 and MTA3 and modems CM1 and CM3, respectively. Terminals TE9 and TE11 incorporate transmission units MTA2 and MTA4, respectively. The latter are connected via modems CM2 and CM4 to access networks AN4 and AN5, respectively.

Transmission units MTA1 to MTA4 are MTA agents (MTA Multimedia Terminal Adapter). The MTA agent provides the subscriber-located functions for VOIP calls.

Access networks AN4 and AN5 are hybrid fiber/coax networks. Modems CM1 to CM4 represent modems for transmitting data over this type of access networks.

IP routers R6 and R7 provide the function of a CMTS system (CMTS=Cable Modem Termination System). They comprise a cable modem, whereby data can be transmitted over access networks AN4 and AN5, respectively, and an IP routing function, whereby IP packets can be switched into communications network TKN'; thus, they provide access from the respective access networks AN4, AN5 to communications network TKN' and terminate the respective access networks AN4, AN5.

Communications network TKN' comprises an IP network IPN2, a telephone network PSN2, a network management system OSS, the gateway GW, and a voice server AS. Of the network elements of IP network IPN2, a call control server GK2 is shown in FIG. 2 by way of example.

Call control server GK2 is identical in construction to call control server GK1 of FIG. 1. Gateway GW is identical in construction to gateway GW of FIG. 1.

Voice server AS makes available voice messages and announcement texts within IP network IPN2. Its essential elements are two control units MPC and MP. Control unit MP performs the function of a media player. This means that it converts recorded voice messages which are present in a given data format into voice signals, and thus plays them back. Control unit MPC is a unit which manages several control units identical in design to control unit MP. Through the interaction of these components, voice server AS generates voice messages which are transmitted over VOIP connections to terminals.

A listening server (not shown in FIG. 2) receives from the server of an authority, for example, a request to monitor a subscriber to whom the terminal TE8 is assigned. To control VOIP calls, terminal TE8 contacts call control server GK2. The listening server thus determines call control server GK2 and causes it to acquire call data associated with calls in which the subscriber of terminal TE8 is involved.

All IP packets from and to terminal TE8 which are transmitted over communications network TKN' are switched by IP router R6. Furthermore, IP router R6 provides access from access network AN4 to communications network TKN'. Thus, router R6 is an IP router which is responsible for the network access by the subscriber of terminal TE8. The listening server thus determines the IP router R6 and causes it is acquire contents data which is associated with calls in which the subscriber of terminal TE8 is involved.

The detailed sequence of steps in the method according to the invention and the detailed design of a listening server according to the invention, a call control server according to the invention, and an IP router according to the invention will now be explained by way of example with reference to FIG. 3.

Figure 3:
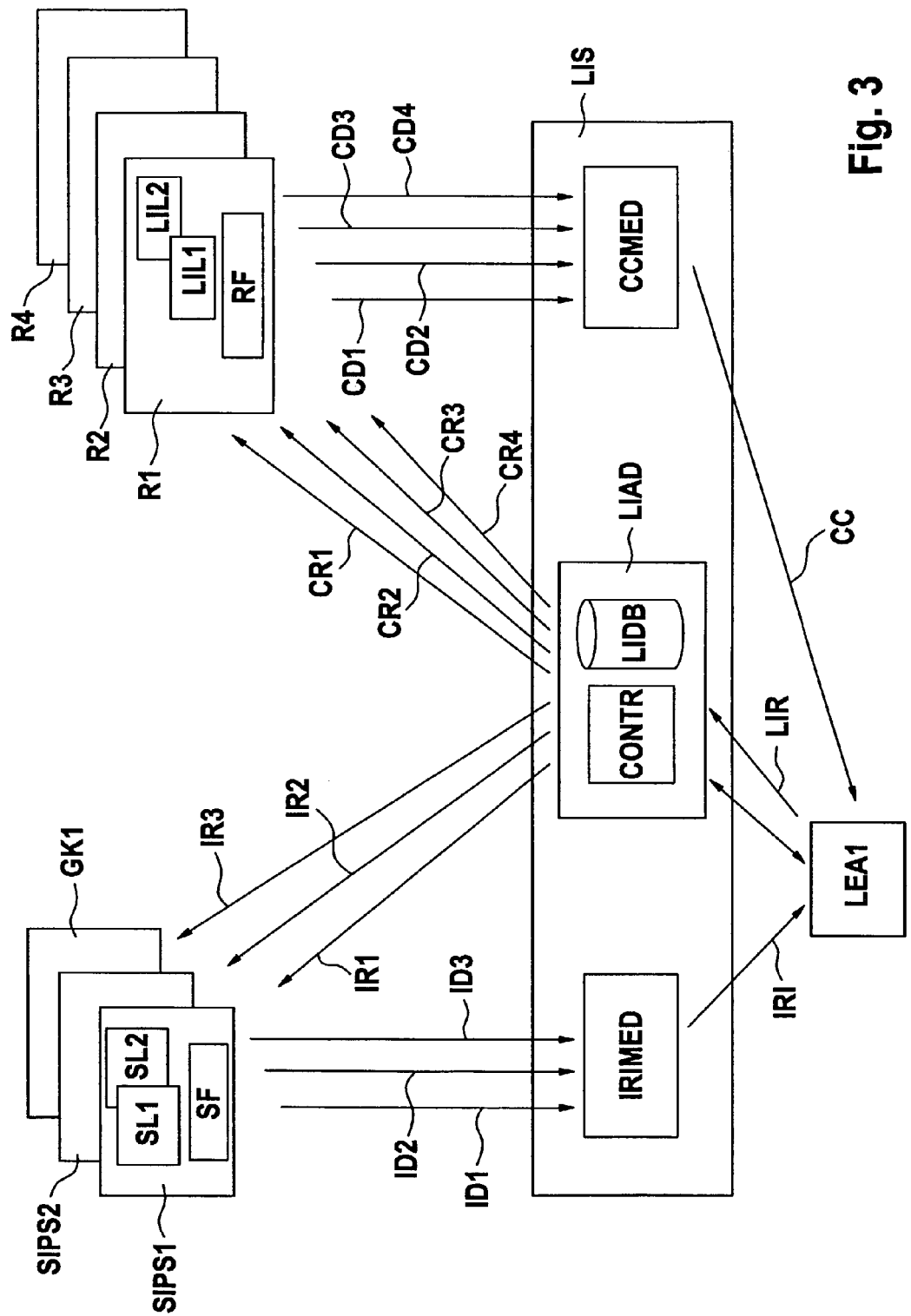
FIG. 3 is a functional diagram of a portion of the communications network of FIG. 1 with a listening server according to the invention, several call control servers according to the invention, and several IP routers according to the invention.

FIG. 3 shows the server LEA1, the listening server LIS, the call control servers SIPS1, SIPS2, and GK1, and the IP routers R1 to R4. Server LEA1, listening server LIS, call control servers SIPS1, SIPS2, and GK1, and IP routers RI to R4 are of the same design as the correspondingly named components of FIG. 1.

Listening server LIS is formed by one or more computers and by the software resting on these computers. By the execution of this software on the hardware platform of listening server LIS, the below-described functions of listening server LIS are provided. From a functional point of view, listening server LIS performs a management function LIAD and two mediation functions IRIMED and CCMED.

Management function LIAD is provided by a control unit CONTR and a database LIDB. Control unit CONTR controls the functions of management function LIAD and is thus formed by the software controlling these functions.

Each of call control servers SIPS1, SIPS2, and GK is formed by one or more interconnected computers and by the software resting on these computers. By the execution of the software on the hardware platform of call control servers SIPS1, SIPS2, and GK1, the below-described functions of call control servers SIPS1, SIPS2, and GK1 are provided. From a functional point of view, call control servers SIPS1, SIPS2, and GK1, on the one hand, have a call control functionality which provides the above-described, known call control functions within IP network IPN1. On the other hand, they contain one or more listening logics. It is also possible that the listening logic or listening logics are loaded into the respective call control servers SIPS1, SIPS2, and GK1 when required.

The functional design of call control servers SIPS1, SIPS2 will now be explained by the example of call control server SIPS1.

Call control server SIPS1 has a call control functionality SF and two listening logics SL1 and SL2. Listening logics SL1 and SL2 are formed by programs which provide the below-described functions of listening logics SL1 and SL2 when being executed on the hardware platform of call control server SIPS1.

IP routers R1 to R4 comprise hardware components, which provide an IP routing functionality, and one or more interconnected computers with the software resting thereon. As explained above, the IP routing functionality may also be spatially separated from this computer or these computers or from part of these computers. Furthermore, the IP routing functionality may be implemented in part or in whole in software. During execution of the software of IP routers R1 to R4 on the hardware platforms of IP routers R1 to R4, the below-described functions of IP routers R1 to R4 are provided. These functions will now be explained by the example of IP router R1.

IP router R1 contains a control unit RF and one or more listening logics, two of which, the listening logics LIL1 and LIL2, are shown in FIG. 3 by way of example.

Control unit RF controls the switching of IP packets in an IP network. It thus provides the above-described IP routing functionality. In addition, control unit RF generally provides functions for processing the lower-level communications protocols, such as functions for processing an ATM protocol stack. Furthermore, control unit RF may process communications protocols and application protocols which are associated with a communication layer above the IP communication layer. Control unit RF also provides functions for processing network access protocols which enable a terminal to access IP network IPN1.

When control unit CONTR of listening server LIS detects a request that a subscriber should be monitored, it determines at least one call control server associated with this subscriber, and it determines at least one IP router which is responsible for a network access point of this subscriber to an IP network of communications network TKN or to two or more IP networks of communications network TKN. To determine these call control servers and these IP routers, control unit CONTR preferably accesses database LIDB.

Database LIDB contains data which assigns call control servers and IP routers of communications network TKN to subscribers of communications network TKN or to terminals which can communicate via communications network TKN. The data of database LIDB may be determined by control unit CONTR using a trial-and-error method or by accessing the network management system of communications network TKN.

It is also possible that listening server LIS does not include the database LIDB and that the above-described data is determined directly by accessing the network management system of communications network TKN.

A subscriber may be specified in the request LIR to control unit CONTR by means of one or more addresses, for example. Addresses may be, for instance, IP addresses, telephone numbers, VOIP telephone numbers, domain names, or e-mail addresses. By accessing the database LIDB, the network management system of communications network TKN, and/or one or more of the call control servers of communications network TKN, control unit CONTR now determines those call control servers of communications network TKN which can provide IP call control functions for calls from or to that address or those addresses.

Advantageously, the address or addresses are used to determine those IP networks of communications network TKN through which calls from or to the respective address are routed.

From this group of call control servers which can possibly provide call control functions, those are selected which are necessarily involved in the provision of a call control service for a VOIP call from or to the respective address or the respective addresses. If the monitoring of a data or video call is requested by the request LIR, those call control servers will be selected which are necessarily involved in the provision of a call control service for a data or video call from or to the respective address.

Advantageously, different call control services being offered in communications network TKN are taken into account in this selection. It is possible, for example, to provide call control services by means of an SIP server, an SIP proxy server, or a gatekeeper, as described above.

The call control servers determined as described above form the call control servers determined by control unit CONTR. It is also possible, however, that all call control servers in communications network TKN are determined by control unit CONTR. Further, only a single call control server may be determined. This call control server is, for instance, the SIP proxy server which is assigned to the respective address.

It is also possible that the "responsibility" of a call control server for a subscriber or terminal changes. That may be the case, for example, if a terminal is connected to communications network TKN via a radio network and if the responsible call control server is dependent on the respective radio network area in which the terminal is located at the respective time. In such a case, it is advantageous to carry out the following method:

When listening logic SL1 detects that the responsibility for the subscriber being monitored is passing to a different call control server, it informs control unit LIAD. Control unit LIAD then determines the newly responsible call control server and causes it to acquire call data associated with calls in which the subscriber to be monitored is involved. Alternatively, listening logic SL1, on detecting the passing of the responsibility for the subscriber being monitored to another call control server, may itself determine the newly responsible call control server and cause the latter to acquire call data associated with calls in which the subscriber to be monitored is involved.

On detecting the request LIR from server LEA1, call control unit CONTR of listening server LIS further determines at least one IP router which is responsible for a network access point of the subscriber to be monitored to one or more IP networks.

If the request LIR contains one or more network addresses for specifying the subscriber to be monitored, control unit CONTR, by evaluating these network addresses, can determine those IP routers of communications network TKN which are responsible for a network access point of the subscriber to one of the IP networks of communications network TKN. It is also possible for the control unit to determine these IP routers by having recourse to database LIDB, to the network management system of communications network TKN, and/or to IP routers of communications network TKN. In that case, control unit CONTR may proceed in an analogous manner as in the determination of the call control servers. IP routers which are responsible for a network access point of a subscriber to be monitored to an IP network of communications network TKN are all IP routers through which IP packets have to be routed from or to one of the network addresses of the subscriber to be monitored. Preferably, these are those IP routers which have a network access functionality and thus perform functions such as subscriber identification.

Mediation functions IRIMED and CCMED transfer call data and contents data received from call control servers and IP routers, respectively, of communications network TKN to one or more servers LEA1 to LEA3. Mediation functions IRIMED and CCMED may also perform further functions, such as conversion of the data structure or temporary storage of these data.

It is also possible that listening server LIS does not incorporate the mediation functions IRIMED and CCMED and that these functions are provided by management function LIAD at distributed locations.

Control unit CONTR now causes the determined call control server(s) to acquire call data associated with calls in which the subscriber specified in the request LIR is involved. To accomplish this, control unit CONTR may send to the determined call control server(s) a control message which activates a listening logic contained in these call control servers. Advantageously, the subscriber to be monitored is specified in this control message. For example, control unit CONTR sends three control messages IR1, IR2, and IR3 to call control servers SIPS1, SIPS2, and GK1, respectively. Each of the latter activates one of the listening logics contained therein, for example the listening logic SL1 of call control server SIPS1.

It is also possible for control unit CONTR to initiate the acquisition of call data by loading a listening logic into the determined call control server(s). It is possible, for example, that control unit CONTR loads a program which constitutes listening logic SL2 into call control server SIPS1, where it is automatically installed and executed. It is also possible to combine the two methods described above, e.g., to load listening logics into call control servers when required and otherwise effect an activation by a corresponding control message.

In the control messages IR1 to IR3, filtering criteria are specified by which VOIP calls in which the subscriber to be monitored is involved can be detected. Such filtering criteria may also be implemented in a service logic loaded by control unit CONTR into a call control server.

Control unit CONTR of listening server LIS further causes the determined IP router(s) to acquire contents data associated with calls in which the subscriber specified in the request LIR is involved.

Control unit CONTR may cause a determined IP router to acquire contents data by activating a listening logic contained in the respective IP router. It is also possible that control unit CONTR loads a listening logic into the determined IP router(s).

Analogously to what was explained above, control unit CONTR sends control messages CR1 to CR4 to the respective IP routers R1 to R4, for example. Control message CR1, for example, activates the listening logic LIL1 contained in IP router R1. Here, too, it is appropriate that filtering criteria for detecting VOIP calls in which the subscriber to be monitored is involved are specified in the control message CR1 to CR4.

Listening logics SL1 and SL2 acquire VOIP call data associated with calls in which one or more subscribers determined by the listening server are involved. This acquisition of call data is initiated by a listening server which, in response to a request to monitor a subscriber, has determined the call control server SIPS1 as a call control server assigned to the subscriber.

Listening logics SL1 and SL2 communicate with control unit SF via an SIPCGI interface (SIPCGI=SIP Common Gate Interface). It is also possible that listening logics SL1 and SL2 are implemented as a script which is specified in CPL (CPL=Call Processing Language) and which is interpreted in this form by control unit SF. The normal sequence of operations for a VOIP call, which is controlled by call control server SIPS1, remains unchanged even though all necessary data is transferred via the interface or the API (Application Program Interface) to the listening logic, which is not visible to the subscriber.

Advantageously, listening logic SL1 is activated by means of a flag present in control unit SF which indicates that a particular listening logic is to be started.

It is advantageous to preserve the neutrality of this flag. The subscriber must not recognize that a service logic, formed by listening logic SL1 or SL2, for example, is being started. This flag corresponds to the TDP (Trigger Detection Point) of the IN. A possible implementation consists in the fact that all call requests must be answered by the service logic, so that listening logic SL1 is triggered for each call setup controlled by call control server SIPS1. As soon as listening logic SL1 is triggered, it filters call data based on filtering criteria determined by the listening server.

Call data which are determined by listening logic SL1 for filtered calls are, for instance, subscribers involved in the call, duration of the call, mode of transmission, networks involved, and network elements involved.

Listening logics SL1 and SL2 transfer the acquired call data to media function IRIMED. Media function IRIMED thus receives call data ID1 to ID3 from call control servers SIPS1, SIPS2, and GK1. The call data thus received are transferred as call data IR1 to server LEA1.

Listening logics LIL1 and LIL2 of IP router R1 acquire contents data associated with calls in which one or more subscribers determined by the listening server are involved. This acquisition of contents data is initiated by a listening server which, in response to a request to monitor a subscriber, has determined the IP router R1 as an IP router responsible for a network access point of the subscriber to an IP network.

Advantageously, in a first step for the acquisition of contents data, listening logic LIL1 determines those of the IP packets switched by the IP router which are associated with VOIP calls and which are sent by the IP router to the subscriber to be monitored or received from the subscriber to be monitored.

The association of an IP packet with a VOIP call or with a video or data call can be determined from the type of application program being processed for the respective IP packet and from parameters of this application program.

Selection criteria are, for instance, IP addresses, port numbers, and the use of the RTP protocol (RTP=Realtime Transport Protocol), SIP protocol, or H.323 protocol. The SIP protocol and the H.323 protocol are designed for communication between a terminal and a network server but can also be used for end-to-end VOIP communication between terminals. The RTP protocol specifies the type of call for which the RTP protocol is used. Parameters of this protocol indicate, for example, whether the call is a voice or a video call and of what quality it is. From the type of protocol used and from these parameters, listening logics LIL1 and LIL2 can thus determine whether the call is a VOIP call, a video call or a data call.

Voice in IP-based networks is transmitted in packets using the RTP protocol above UDP and IP (UDP=User Datagram Protocol). Each RTP or UDP packet may travel a different path in communications network TKN. The only point that must be passed by all voice data packets is the subscriber's entry point into the IP network. Like a firewall, listening logic LIL1 checks all packets that pass through router R1. Unlike a firewall, where given IP ports are blocked, the action of listening logic LIL1 is more discriminating. Criteria in addition to IP address, port number (per direction of call), and application protocol may be parameters of the application program, i.e., of the RTP protocol. These parameters provide information on the type of payload, for example, i.e., speech, encoding, etc. By means of these parameters, listening logic LIL1 determines whether a data packet is associated with the VOIP call in which a subscriber specified by the listening server is involved. Listening logic LIL1 is also capable of detecting concealed VOIP calls. This also makes it possible to detect direct end-to-end connections which are not established or not supported by a call control server. Contents data of such concealed VOIP calls are acquired in the same manner. It is also possible that in such a case, call data are acquired by listening logic LIL1 as well.

Listening logics LIL1 and LIL2 copy the IP packets determined by them and transfer the copies as acquired contents data of calls to be monitored to mediation function CCMED of listening server LIS. Mediation function CCMED thus receives contents data CD1 to CD4 from IP routers R1 to R4. The contents data so received is transferred by mediation function CCMED as contents data CC to server LEA1.

It is also possible that IP routers R1 to R4 are not determined and not caused to acquire data by control unit CONTR. This function of control unit CONTR may also be provided by the listening logics of the call control servers determined by control unit CONTR. In that case, the following two-step method is carried out.

First, control unit CONTR, in response to a request LIR to monitor a subscriber, determines one or more call control servers and causes the latter to acquire call data about the subscriber to be monitored. Further, the determined call control server(s) is (are) caused to determine one or more IP routers which are responsible for a network access point of the subscriber to an IP network. These IP routers determined by the call control server(s) are then caused by the determined call control server(s) to acquire contents data associated with calls in which the subscriber to be monitored is involved.

During the acquisition of contents data and call data, communication is possible between the call control server and the IP router(s) determined by this server. Such communication is particularly advantageous for detecting concealed VOIP calls and transferring synchronized call data and contents data to listening server LIS.

The invention claimed is:

1. A method of listening in to calls between two or more subscribers of a communications network comprising one or more IP networks, the method comprising
   when a listening server detects a request to monitor one of the subscribers, said listening server determining at least one call control server associated with the subscriber;
   determining at least one IP router which is responsible for a network access point of the subscriber to the IP network or IP networks;
   the listening server causing the at least one determined call control server to acquire call data associated with calls in which the subscriber is involved; and
   the at least one determined IP router acquiring contents data associated with calls in which the subscriber is involved.

2. A method as set forth in claim 1, wherein the listening server determines the at least one IP router and causes the at least one IP router to acquire contents data.

3. A method as set forth in claim 1, wherein the at least one determined call control server determines the at least one IP router and causes the at least one IP router to acquire content data.

4. A method as set forth in claim 1, wherein the listening server causes a determined call control server to acquire call data by activating a listening logic contained in the call control server.

5. A method as set forth in claim 1, wherein the listening server causes a determined call control server to acquire call data by loading a listening logic into the call control server.

6. A method as set forth in claim 4, wherein the listening logic is triggered for each call setup controlled by the call control server and, as soon as it is triggered, filters call data based on filtering criteria determined by the listening server.

7. A method as set forth in claim 1, wherein a determined IP router is caused to acquire contents data by activating a listening logic incorporated in the IP router.

8. A method as set forth in claim 1, wherein a determined IP router is caused to acquire contents data by loading a listening logic into the IP router.

9. A method as set forth in claim 1, further comprising triggering a listening logic for each call setup controlled by the call control server, and as soon as it is triggered, filtering call data based on filtering criteria determined by the listening server.

10. A listening server that supports the listening in to calls between two or more subscribers of a communications network comprising one or more IP networks, wherein the listening server comprises:
    a control unit; and
    a database;
    wherein, when the control unit detects a request to monitor one of the subscribers, the control unit accesses the database to determine at least one call control server associated with the subscriber, and causes the at least one determined call control server to acquire call data associated with calls in which the subscriber is involved.

11. A listening server as set forth in claim 10, wherein the control unit determines at least one IP router which is responsible for a network access point of the subscriber to the IP network or IP networks, and the control unit causes the at least one determined IP router to acquire contents data associated with calls in which the subscriber is involved.

12. A listening server as set forth in claim 9, wherein said control unit triggers a listening logic for each call setup controlled by the call control server and, as soon as it is triggered, filters call data based on filtering criteria determined by the listening server.

13. A call control server comprising a control unit that controls calls in an IP network, wherein the call control server further comprises:
a listening logic;
wherein, when a listening server, in response to a request to monitor a subscriber, has determined the call control server as a call control server associated with the subscriber, said listening server causes said listening logic to acquire contents data associated with calls in which one or more subscribers determined by the listening server are involved.

14. A call control server as set forth in claim 13, wherein the listening logic is further designed to determine at least one IP router which is responsible for a network access point of the subscriber to the IP network or IP networks, and that the listening logic is further designed to cause the at least one determined IP router to acquire contents data associated with calls in which the subscriber is involved.

15. A call control server as set forth in claim 13, wherein the listening logic is triggered for each call setup controlled by the call control server, and as soon as it is triggered, filters call data based on filtering criteria determined by the listening server.

16. An IP router comprising a control unit that controls the switching of IP packets in an IP network, wherein the IP router comprises:
a listening logic;
wherein, when a listening server, in response to a request to monitor a subscriber, has determined the IP router as an IP router responsible for a network access point of the subscriber to the IP network, said listening server causes said listening logic to acquire contents data associated with calls in which one or more subscribers determined by the listening server are involved.

17. An IP router as set forth in claim 16, wherein for the acquisition of contents data, the listening logic is further designed to determine those of the IP packets switched by the IP router which are associated with calls and which are sent by the IP router to the subscriber or received from the subscriber.

18. An IP router as set forth in claim 17, wherein the listening logic is further designed to determine the association of an IP packet with a call from the kind and from parameters of the application program being processed for the IP packet.

19. An IP router as set forth in claim 17, wherein the listening logic is further designed to copy the IP packets determined by it and to transfer the copies to the listening sever.

* * * * *